(12) United States Patent
Zhou et al.

(10) Patent No.: US 8,874,715 B2
(45) Date of Patent: Oct. 28, 2014

(54) CHARGING METHOD, SYSTEM AND REPORTING METHOD FOR TERMINAL ACCESSING THROUGH MULTIPLE ACCESS NETWORKS

(75) Inventors: Xiaoyun Zhou, Shenzhen (CN); Zaifeng Zong, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 216 days.

(21) Appl. No.: 13/254,728

(22) PCT Filed: Sep. 7, 2009

(86) PCT No.: PCT/CN2009/073776
§ 371 (c)(1),
(2), (4) Date: Sep. 2, 2011

(87) PCT Pub. No.: WO2010/108356
PCT Pub. Date: Sep. 30, 2010

(65) Prior Publication Data
US 2011/0320580 A1 Dec. 29, 2011

(30) Foreign Application Priority Data
Mar. 21, 2009 (CN) .......................... 2009 1 01286912

(51) Int. Cl.
*G06F 15/173* (2006.01)
*G06F 17/00* (2006.01)
*H04M 15/00* (2006.01)
*H04L 12/14* (2006.01)

(52) U.S. Cl.
CPC .............. *H04L 12/14* (2013.01); *H04L 12/1407* (2013.01); *H04L 12/1403* (2013.01); *H04M 15/00* (2013.01); *H04L 12/1485* (2013.01)
USPC .............................................. 709/223; 726/1

(58) Field of Classification Search
USPC ........................................................ 709/223
See application file for complete search history.

(56) References Cited

U.S. PATENT DOCUMENTS 7,895,145 B2 * 2/2011 Wang et al. ....................... 706/46
8,355,325 B2 * 1/2013 Huang et al. ................... 370/230
(Continued)

FOREIGN PATENT DOCUMENTS

| CN | 1968503 A | 5/2007 |
| CN | 101127629 A | 2/2008 |
| CN | 101296092 A | 10/2008 |

OTHER PUBLICATIONS

3rd Generation Partnership Project; Technical Specification Group Services and System Aspects; Policy and charging control architecture, Release 7, V7.2.0, Mar. 2007, pp. 1-72.*

(Continued)

*Primary Examiner* — Hamza Algibhah
*Assistant Examiner* — James Edwards
(74) *Attorney, Agent, or Firm* — McClure, Qualey & Rodack, LLP (57) ABSTRACT

The present invention provides a charging method and system for a terminal being accessed through multiple access networks, and a reporting method for a terminal being accessed through multiple access networks. When the terminal establishes one IP Connectivity Access Network (IP-CAN) session with a packet data network through at least one access network, an IP-CAN Type parameter of each access network connection passed through by a data flow of a service accessed by said terminal is sent to a charging subsystem, and said charging subsystem charges differently for data flows passing through different access network connections of said terminal according to said IP-CAN Type parameter.

13 Claims, 6 Drawing Sheets

(56) References Cited

U.S. PATENT DOCUMENTS

2008/0046963 A1* 2/2008 Grayson et al. .................. 726/1
2008/0232376 A1* 9/2008 Huang et al. ............... 370/395.3
2008/0253368 A1* 10/2008 Rasanen ....................... 370/389

OTHER PUBLICATIONS

3GPP TS 23.203 V8.4.0 (Dec. 2008). 3rd Generation Partnership Project; Technical Specification Group Services and System Aspects; Policy and Charging Control Architecture (Release 8), pp. 1-111.

"3rd Generation Partnership Project; Technical Specification Group Services and System Aspects; Architecture Enhancements for non-3GPP Accesses (Release 8)"; 3GPP TS 23.402 V9.0.0 (Jun. 2008); pp. 169-181.

"3rd Generation Partnership Project; Technical Specification Group Services and System Aspects; Policy and Charging Control Architecture (Release 9)"; 3GPP TS 23.203 V9.0.0 (Mar. 2009); pp. 1-84.

"3rd Generation Partnership Project; Technical Specification Group Services and System Aspects; Policy and Charging Control Architecture (Release 9)"; 3GPP TS 23.203 V9.0.0 (Mar. 2009); pp. 85-113.

Ericsson, Cingular, Huawei, QUALCOMM, Vodafone: "Binding Mechanism vs. Binding Association"; 3GPP TSG SA WG2 Architecture—S2#52; May 8-12, 2006.

"3rd Generation Partnership Project; Technical Specification Group Services and System Aspects; Architecture Enhancements for non-3GPP Accesses (Release 8)"; 3GPP TS 23.402 V9.0.0 (Jun. 2008); pp. 1-84.

"3rd Generation Partnership Project; Technical Specification Group Services and System Aspects; Architecture Enhancements for non-3GPP Accesses (Release 8)"; 3GPP TS 23.402 V9.0.0 (Jun. 2008); pp. 85-168.

* cited by examiner

CHARGING METHOD, SYSTEM AND REPORTING METHOD FOR TERMINAL ACCESSING THROUGH MULTIPLE ACCESS NETWORKS

CROSS REFERENCE RELATED APPLICATIONS

This application is a national phase of PCT/CN2009/073776 filed Sep. 7, 2009, which claims priority to China Application Serial No. 200910128691.2, filed Mar. 21, 2009, both of which are entirely incorporated herein by reference.

TECHNICAL FIELD

The present invention relates to the 3rd Generation Partnership Project (3GPP) Evolved Packet System (EPS), and particularly, to a charging method and system for a terminal being accessed through multiple access networks, and a reporting method for a terminal being accessed through multiple access networks.

BACKGROUND OF THE RELATED ART

The EPS system of the 3rd Generation Partnership Project (3GPP) mainly comprises an Evolved Universal Terrestrial Radio Access Network (E-UTRAN), a Mobility Management Entity (MME), a Serving Gateway (S-GW), a Packet Data Network Gateway (P-GW or PDN GW), a Home Subscriber Server (HSS), an Authentication, Authorization and Accounting (AAA) server of the 3GPP, a Policy and Charging Rules Function (PCRF) entity and other supporting nodes.

Figure 1:
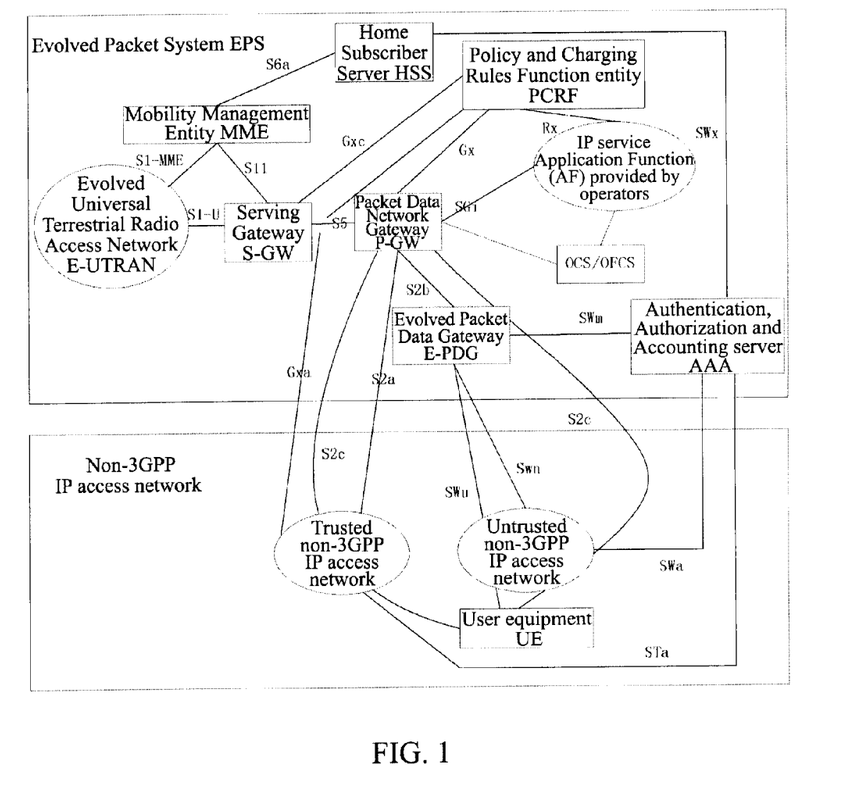
FIG. 1 is a schematic diagram of the system architecture of EPS in the prior art.

FIG. 1 is a schematic diagram of the system architecture of the EPS, and the MME is responsible for the control plane related operations such as the mobility management, signaling process of the non-access layer and management of the user mobility management context and so on; the S-GW is an access gateway device connected with the E-UTRAN, and forwards data between the E-UTRAN and P-GW, and is responsible for caching the paging waiting data; the P-GW is a border gateway of the EPS and the Packet Data Network (PDN), and is responsible for the PDN being accessed and for forwarding data between the EPS and the PDN and so on; the PCRF is a policy and charging rules function entity, which is connected with an operator Internet Protocol (IP) service network through a receiving interface Rx, and obtains service data, and besides, the PCRF is connected with gateway devices in the network through the Gx or Gxa or Gxc interface, and is responsible for initiating the IP bearer setup, ensuring the Quality of Service (QoS) of the service data, and carrying out the charging control.

The EPS supports the interworking with the non-3GPP system, and the interworking with the non-3GPP system is implemented through the S2a/b/c interfaces, and the P-GW is the anchor point between the 3GPP and the non-3GPP systems. In the architecture diagram of EPS system of FIG. 1, the non-3GPP system is divided into a trusted non-3GPP IP access network and an untrusted non-3GPP IP access network. The trusted non-3GPP IP access network can be connected with the P-GW through the S2a interface directly; and the untrusted non-3GPP IP access requires connecting with the P-GW through the Evolved Packet Data Gateway (E-PDG), and the interface between the E-PDG and the P-GW is the S2b, and the S2c provides the user plane related control and the mobility support between the User Equipment (UE) and the P-GW, and the supported mobility management protocol is the IPv6 Support for Dual Stack Hosts and Routers (DSMIPv6).

In the EPS system, the Policy and Charging Enforcement Function (PCEF) entity exists in the P-GW, and the PCRF and P-GW exchange information through the Gx interface. When the interface between the P-GW and the S-GW is based on the PMIPv6, the S-GW also has the Bearer Binding and Event Report Function (BBERF) entity to carry out the QoS control on the service data flow, and the S-GW and the PCRF exchange information through the Gxc interface. When accessed through the trusted non-3GPP access system, the BBERF also resides in the trusted non-3GPP access gateway. The trusted non-3GPP access gateway and the PCRF exchange information through the Gxa interface (the dotted line shown in FIG. 1). The Application Function (AF) which provides services to the UE sends service information used for making a Policy and Charging Control (PCC) policy to the PCRF through the Rx interface. In the 3GPP, the corresponding PDN network can be found through the Access Point Name (APN). Generally, a connection from the UE to the PDN network is called as an IP Connectivity Access Network (IP-CAN) session.

Figure 2:
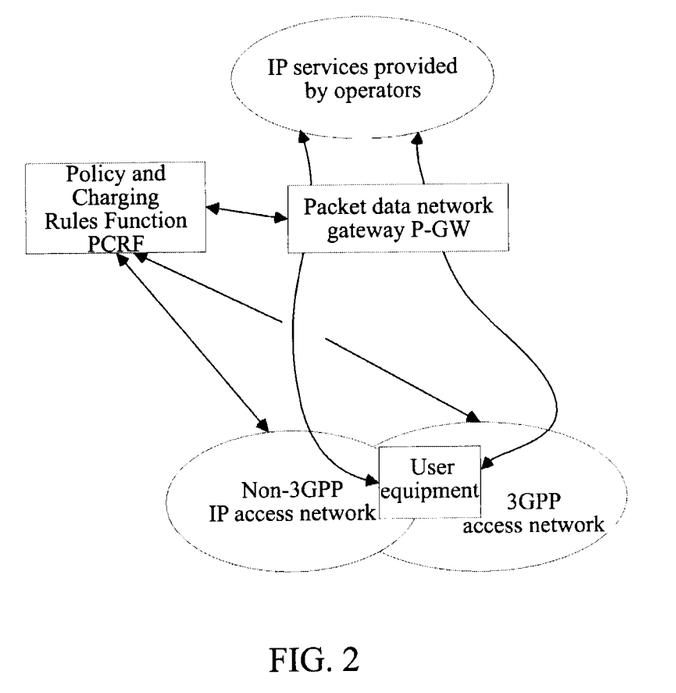
FIG. 2 is a schematic diagram of the Multiple Access scenario of the user equipment in the prior art.

The EPS supports UE accessing one PDN network (namely the operator providing IP service located network) through multiple access networks at the same time, which is also called Multiple Access. As shown in FIG. 2, the UE is in the coverage of the non-3GPP access network and the 3GPP access network at the same time, and accesses the PDN network via the same P-GW through the non-3GPP IP access network and the 3GPP access network.

In this scenario, the P-GW allocates one IP address for UE, namely there is only one IP-CAN session between the UE and the PDN. The UE, P-GW or PCRF determines which access network connection the IP data flow is transmitted through according to different characteristics of the services. For example, the non-3GPP access network is the Wireless Fidelity (WiFi) network, and service data flows of the Hyper Text Transfer Protocol (HTTP) and File Transfer Protocol (Ftp) can pass through the connection of the WiFi access network, and at the same time service data flows of the Voice Over Internet Protocol (VoIP) based on the IP network can be sent to the user equipment through the 3GPP, and thus the services which have lower real time requirements such as the HTTP and Ftp and so on can take the advantage of lower tariff of WiFi; and the services which have higher real time requirements such as the VoIP and so on can take the advantages of the QoS control and the better mobility management of the 3GPP.

In the prior art, the AF is required to provide charging information of application layer to the Online Charging System (OCS)/Offline Charging System (OFCS) to be used for the charging of the application layer, and at this time, the AF is required to provide the IP-CAN type used by the current access service of user to the OCS/OFCS to carry out charging, and the IP-CAN type could also include the Radio Access Technology Type (RAT Type). However, in the prior art, one IP-CAN session of the UE can only have one IP Connectivity Access Network Type (IP-CAN Type) (further also includes one Radio Access Technology Type), and thus after the user establishes an IP-CAN session, as long as the PCRF reports the IP-CAN Type of this IP-CAN session or further carries the RAT Type, all the IP data flows of the service provided by the AF will be charged according to the IP-CAN Type or RAT Type. For the case of UE being accessed through the multiple access networks, how to make the application layer know this Multiple Access case and how to implement reasonable charging in the Multiple Access scenario, the prior art does not provide a solution. Similarly, the PCEF is also required to provide the charging information of the bearer layer to the OCS/OFCS to be used for the charging of the bearer layer, and for the case of UE being accessed through multiple access networks, how to implement reasonable charging in the Multiple Access scenario, the prior art does not provide a solution.

SUMMARY OF THE INVENTION

The technical problem to be solved in the present invention is to provide a charging method and system for a terminal being accessed through multiple access networks and a reporting method for a terminal being accessed through multiple access networks, which implement differentiated charging and make the charging more reasonable.

In the scenario of the UE being accessed through multiple access networks, one IP-CAN session of the UE has at least one IP-CAN Type and/or RAT Type, the multiple services accessed by the UE are transmitted through the access network connections of the different Radio Access Technology Types at the same time, and even different IP data flows of one service accessed by the UE will be transmitted through the access network connections of the different Radio Access Technology Types. Therefore, after the network determines the access network connection through which a service or a certain IP data flow of the service is transmitted, in the application layer, the PCRF should notify the AF so that the AF notifies the OCS/OFCS or other network elements to be used for differentiated charging. Similarly, for the bearer layer, the PCEF is also required to provide the charging information of the bearer layer to be used for the charging of the bearer layer; at this time, when the UE is accessed through the Multiple Access, the PCEF is required to notify the Multiple Access case to the OCS/OFCS. The Multiple Access case of terminal is notified to the OCS/OFCS system through the application layer and the bearer layer respectively, which can be used for the charging demand of different operators in the application layer and bearer layer respectively.

In order to solve the above problem, the present invention provides a charging method for a terminal being accessed through multiple access networks, and said charging method comprises:

when the terminal establishes one IP Connectivity Access Network (IP-CAN) session with a packet data network through at least one access network, a charging subsystem obtaining Multiple Access of said terminal and carrying out charging, and a charging mode being one or two of following modes:

mode one, a Policy and Charging Rules Function (PCRF) sending an IP-CAN Type parameter of each access network connection passed through by a data flow of a service accessed by said terminal to an Application Function (AF), said AF sending said IP-CAN Type parameter to said charging subsystem, and said charging subsystem charging differently for data flows passing through different access network connections of said terminal according to said IP-CAN Type parameter;

mode two, a Policy and Charging Enforcement Function (RCEF) sending the IP-CAN Type parameter of each access network passed through by the data flow of the service accessed by said terminal to said charging subsystem, and said charging subsystem charging differently for data flows passing through different access network connections of said terminal according to said IP-CAN Type parameter.

Furthermore, in the above charging method, said IP-CAN Type parameter includes an IP Connectivity Access Network type, or besides including said IP Connectivity Access Network type, also includes a Radio Access Technology Type.

Furthermore, when the charging mode in the above charging method is the mode one, said charging method further comprises:

when the access network connection passed through by the data flow of the service accessed by said terminal is changed, said PCRF sending the IP-CAN Type parameter of a new access network connection passed through by said data flow and an identifier of said data flow to said charging subsystem through said AF, said charging subsystem identifying said data flow according to said identifier, and charging for said data flow according to a charging rule of the access network corresponding to the IP-CAN Type parameter of said new access network connection.

Furthermore, when the charging mode in the above charging method is the mode two, said charging method further comprises:

when the access network connection passed through by the data flow of the service accessed by said terminal is changed, said PCEF sending the IP-CAN Type parameter of a new access network connection passed through by said data flow and an identifier of said data flow to said charging subsystem, said charging subsystem identifying said data flow according to said identifier, and charging for said data flow according to a charging rule of the access network corresponding to the IP-CAN Type parameter of said new access network connection.

Furthermore, when the charging mode in the above charging method is the mode one, said charging method further comprises:

said AF notifying said PCRF that when said terminal is accessed through multiple access networks, said PCRF is required to report the IP-CAN Type parameter of each access network connection passed through by the data flow of the service accessed by said terminal to said AF; and after receiving a notification, said PCRF reporting the IP-CAN Type parameter of each access network connection to said AF when said terminal is accessed through multiple access networks.

Furthermore, when the charging mode in the above charging method is the mode one, said charging method further comprises:

said charging subsystem notifying said PCEF that when said terminal is accessed through multiple access networks, said PCEF is required to report the IP-CAN Type parameter of each access network connection passed through by the data flow of the service accessed by said terminal to said charging subsystem; and after receiving a notification, said PCEF reporting the IP-CAN Type parameter of each access network connection to said charging subsystem when said terminal is accessed through multiple access networks.

In order to solve the above technical problem, the present invention also provides a charging system for a terminal being accessed through multiple access networks, and said charging system comprises an IP Connectivity Access Network (IP-CAN) Type parameter reporting subsystem and a charging subsystem, wherein, said IP-CAN Type parameter reporting subsystem is configured to report an IP-CAN Type parameter of each access network connection passed through by a data flow of a service accessed by said terminal to said charging subsystem when the terminal establishes one IP-CAN session with a packet data network through at least one access network;

said charging subsystem is configured to charge differently for data flows passing through different access network connections of said terminal according to said IP-CAN Type parameter.

Furthermore, said IP-CAN Type parameter reporting subsystem comprises a Policy and Charging Rules Function (PCRF) and an Application Function (AF); wherein said PCRF is configured to send the IP-CAN Type parameter of each access network connection passed through by the data flow of the service accessed by said terminal to said AF;

said AF is configured to send the received IP-CAN Type parameter to said charging subsystem.

Furthermore, in the above charging system, said PCRF is also configured to send the IP-CAN Type parameter of a new access network connection passed through by said data flow and an identifier of said data flow to said AF when the access network connection passed through by the data flow of the service accessed by said terminal is changed;

said AF is also configured to send the IP-CAN Type parameter of the new access network connection passed through by said data flow and the identifier of said data flow received from said PCRF to said charging subsystem;

said charging subsystem is also configured to identify said data flow according to said identifier, and charge for said data flow according to a charging rule of the access network corresponding to the IP-CAN Type parameter.

In order to solve the above technical problem, the present invention also provides a charging system for a terminal being accessed through multiple access networks, and said charging system comprises an IP Connectivity Access Network (IP-CAN) Type parameter reporting subsystem and a charging subsystem, wherein, said IP-CAN Type parameter reporting subsystem is configured to report an IP-CAN Type parameter of each access network connection passed through by a data flow of a service accessed by said terminal to said charging subsystem when the terminal establishes one IP-CAN session with a packet data network through at least one access network;

said charging subsystem is configured to charge differently for data flows passing through different access network connections of said terminal according to said IP-CAN Type parameter;

wherein said IP-CAN Type parameter reporting subsystem comprises a Policy and Charging Enforcement Function (PCEF);

said PCEF is configured to send the IP-CAN Type parameter of each access network connection passed through by the data flow of the service accessed by said terminal to said charging subsystem.

Furthermore, in the above charging system, said PCEF is also configured to send the IP-CAN Type parameter of a new access network connection passed through by said data flow and an identifier of said data flow to said charging subsystem when the access network connection passed through by the data flow of the service accessed by said terminal is changed;

said charging subsystem is also configured to identify said data flow according to said identifier, and charge for said data flow according to a charging rule of the access network corresponding to the IP-CAN Type parameter.

In order to solve the above problem, the present invention also provides a reporting method of a terminal being accessed through multiple access networks, and said reporting method comprises:

when the terminal establishes one IP Connectivity Access Network (IP-CAN) session with a packet data network through at least one access network, a Policy and Charging Rules Function (PCRF) sending an IP-CAN Type parameter of each access network connection passed through by a data flow of the service accessed by said terminal to an Application Function (AF).

Furthermore, the above reporting method further comprises:

when the access network connection passed through by the data flow of the service accessed by said terminal is changed, said PCRF sending the IP-CAN Type parameter of a new access network connection passed through by said data flow and an identifier of said data flow to said AF.

Furthermore, the above reporting method further comprises:

said AF notifying said PCRF that when said terminal is accessed through multiple access networks, said PCRF is required to report the IP-CAN Type parameter of each access network connection passed through by the data flow of the service accessed by said terminal to said AF; and after receiving a notification, said PCRF reporting the IP-CAN Type parameter of each access network connection to said AF when said terminal is accessed through multiple access networks.

The method and system of the present invention can be used to implement differentiated charging according to the difference of different access networks of terminal, which makes the charging more reasonable, and also meets the charging demand of different content providers.

PREFERRED EMBODIMENTS OF THE PRESENT INVENTION

In the following examples, it will take the Online Charging System (OCS) as an example to describe the related functions of the charging system for a terminal being accessed through multiple access networks, and in other examples, the Offline Charging System (OFCS) can also be used. In the examples, the OCS/OFCS can also be called as the charging subsystem in the charging system for a terminal being accessed through multiple access networks.

Example One

There are two charging systems for a terminal being accessed through multiple access networks, and both comprise an IP Connectivity Access Network (IP-CAN) Type parameter reporting subsystem and a charging subsystem;

the IP-CAN Type parameter reporting subsystem is used for when a terminal establishes one IP Connectivity Access Network (IP-CAN) session with the packet data network through at least one access network, reporting an IP-CAN Type parameter of each access network connection passed through by the data flows of services accessed by said terminal to said charging subsystem;

the charging subsystem is used for charging differently for the data flows passing through different access network connections according to said IP-CAN Type parameters; and is also used for when the access network connection passed through by a data flow of the service accessed by said terminal is changed, identifying this data flow according to the identifier of received data flow, and charging for this data flow according to the charging rule of the access network corresponding to this IP-CAN Type parameter.

In this example, the IP-CAN Type parameter reporting subsystem of one of the charging system comprises a Policy and Charging Rule Function (PCRF) and an Application Function (AF);

the PCRF is used for when the terminal establishes one IP-CAN session with the packet data network through at least one access network, sending the IP-CAN Type parameters of each access network connection passed through by the data flow of services accessed by terminal to said AF; and is also used for when the access network connection passed through by a data flow of the service accessed by terminal is changed, sending the IP-CAN Type parameters of the new access network connection passed through by this data flow and the identifier of this data flow to said AF;

the AF is used for sending received said IP-CAN Type parameters to said charging subsystem; and is also used for sending the IP-CAN Type parameters of the new access network connection passed through by the data flow and the identifier of this data flow received from said PCRF to said charging subsystem.

In this example, another IP-CAN Type parameter reporting subsystem of the charging system comprises a Policy and Charging Enforcement Function (PCEF);

the PCEF is used for when the terminal establishes one IP-CAN session with the packet data network through at least one access network, sending the IP-CAN Type parameters of each access network connection passed through by the data flows of the service accessed by the terminal to said charging subsystem.

Figure 3:
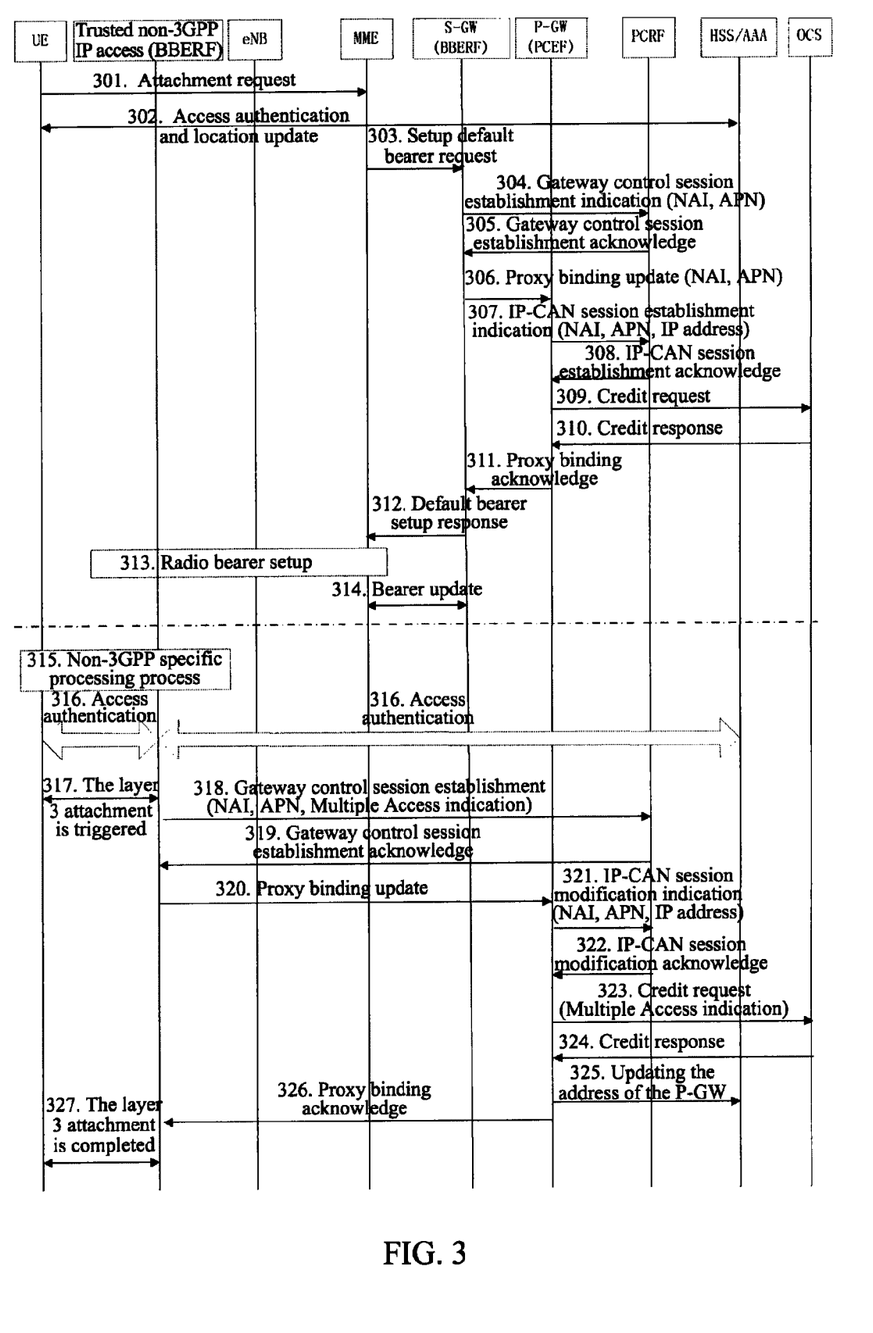
FIG. 3 is a flow chart of the PCEF notifying the Multiple Access case of terminal to the OCS according to the example one.

This example describes when the UE is located in the dual coverage area of the 3GPP access network and trusted non-3GPP access network, and when the UE establishes a connection to the default PDN network through 3GPP access network and trusted non-3GPP access network (for example the HRPD) at the same time, the PCEF notifies the multiple access case of terminal to the OCS, and the OCS carries out the process of differentiated charging, wherein when the terminal is accessed through the 3GPP, the PMIPv6 protocol is used between the S-GW and the P-GW, and when the terminal is accessed through the trusted non-3GPP, the PMIPv6 protocol is used between the trusted non-3GPP access network management and the P-GW; and particularly, the following steps are comprised:

Step 301, the UE sends an attachment request message to the MME;

Step 302, the MME initiates an authentication flow for the UE, and MME and HSS exchange authentication related information according to requirements; after authentication succeeds, the MME initiates a location update flow, and the HSS sends the subscription data of UE to the MME, and in the authentication process, the HSS sends the selection information of the P-GW to the MME, including the default Access Point Name (APN), and when the MME selects the P-GW according to the APN, the MME selects the S-GW at the same time;

Step 303, the MME sends a default bearer setup request message to the S-GW, wherein this default bearer setup request message carries the APN and the IP address of the selected P-GW;

Step 304, the S-GW in which the BBERF resides carries the Network Access Identifier (NAI) of the UE and APN in the gateway control session establishment indication message which is sent to the PCRF;

Step 305, the PCRF makes the PCC rules and QoS rules according to the user's subscription data, network policy, and bearer attribute and so on, and at the same time, corresponding event trigger could also be made, and the PCRF sends the QoS rules and the event trigger to the S-GW through the gateway control session establishment acknowledge message, and the S-GW installs the QoS rules and the event trigger;

Step 306, the S-GW sends the proxy binding update request message to the P-GW, wherein this proxy binding update request message carries the NAI of the terminal and the APN;

the step 306 can send the proxy binding update request message just after receiving the message of step 303, without waiting for the response of the step 305.

Step 307, the P-GW in which a PCEF resides sends an IP-CAN session establishment indication message to the PCRF, wherein this IP-CAN session establishment indication message includes the NAI, APN and the IP address which is allocated to the UE by the P-GW; the PCRF associates the IP-CAN session establishment indication message with the gateway control session establishment indication message in step 305 by the NAI and APN, and thereby the information set up in the PCRF by these two messages is associated with the same IP-CAN session;

Step 308, the PCRF returns an IP-CAN session establishment acknowledge message to the P-GW, wherein this IP-CAN session establishment acknowledge message carries the corresponding PCC rules and the event trigger, and the PCEF installs the PCC rules and the event trigger;

If the information carried in the IP-CAN session establishment indication message in step 307 causes the QoS rules to be changed, the PCRF sends the new QoS rules to the trusted non-3GPP access gateway through the gateway control and QoS rules provisioning message, and if the event trigger is also changed, the new event trigger is provided, and this message can be sent at the same time with the step 308. After receiving the message, the BBERF returns the acknowledge message.

Step 309, the P-GW sends a credit request to the OCS, and the message carries a user identifier, APN and the IP-CAN Type parameters, and the IP-CAN Type parameters can be the IP-CAN Type or further carries the Radio Access Type (RAT Type), and the current accessed IP-CAN Type is the 3GPP_EPS, and the RAT Type is the E-UTRAN;

Step 310, the OCS makes the policy of the reporting the credit control information according to the IP-CAN Type 3GPP_EPS and the RAT Type E-UTRAN, such as re-authorized trigger and so on, and returns to the PCEF;

Step 311, the P-GW returns the proxy binding acknowledge message to the S-GW, wherein this proxy binding acknowledge message carries the IP address which is allocated to the UE by the P-GW;

Step 312, the S-GW returns a default bearer setup confirmation message to the MME, wherein this default bearer setup confirmation message carries the IP address of the UE;

Step 313, the MME, eNodeB, and UE interactively set up the radio bearer;

Step 314, after setting up the radio bearer, the MME sends an update bearer request to the S-GW, and notifies the address information of the eNodeB and so on, and the S-GW returns a response message;

Step 315, the UE enforces the specific non-3GPP access process, and accesses the trusted non-3GPP access network;

Step 316, after accessing the trusted non-3GPP access network, the UE requests the HSS/AAA to carry out the EPS access authentication; after receiving the EPS access authentication request, the HSS/AAA carries out the authentication on the UE which sends a request; and after completing the authentication of the UE, the HSS/AAA returns the P-GW selected in the 3GPP access and the UE subscribed APN, including default APN, to the trusted non-3GPP access gateway;

Step 317, after the authentication succeeds, the attachment flow of the layer 3 is triggered, and the message which is sent to the trusted non-3GPP access gateway by the UE carries the Multiple Access indication;

Step 318, the trusted non-3GPP access gateway in which the BBERF resides sends a gateway control session establishment indication message to the PCRF, wherein the gateway control session establishment indication message carries the identifier NAI of the UE, APN and Multiple Access indication;

Step 319, the PCRF judges the UE is Multiple Access according to the Multiple Access indication, and associates this message with the messages in steps 304 and 307 according to the NAI and APN, and thereby the information set up in the PCRF by these three messages is associated with the same IP-CAN session. Furthermore, the PCRF makes the PCC rules and QoS rules for the services which will be transferred to the IP-CAN session accessed through the non-3GPP according to the user's subscription data, network policy and bearer attribute and so on, and at the same time, a corresponding event trigger could also be made; the PCRF sends these new made QoS rules and event trigger to the BBERF through a gateway control session establishment acknowledge message, and the BBERF installs the QoS rules and event trigger;

Step 320, the trusted non-3GPP access gateway sends the proxy binding update request message to the P-GW, wherein this proxy binding update request message carries the NAI, APN and Multiple Access indication, and the step 320 can send the proxy binding update request message just after receiving the message of the step 317, without waiting for the response of the step 319;

Step 321, the P-GW in which the PCEF resides uses the IP-CAN session established in step 307, and sends the IP-CAN session modification indication message to the PCRF, wherein this IP-CAN session modification indication message carries the NAI of the terminal, APN and the IP address;

Step 322, the PCRF returns the IP-CAN session modification acknowledge message to the P-GW, wherein the IP-CAN session modification acknowledge message carries the PCC rules and event trigger made in step 317, and the P-GW updates the PCC rules and the event trigger. The PCRF may update the PCC rules over again according to the information carried in step 319.

Step 323, the PCEF sends the credit request to the OCS, and the message carries the Multiple Access indication and this terminal accessed IP-CAN Type parameters, and the IP-CAN Type parameters can be the IP-CAN Type, or can further carries the Radio Access Type (RAT Type), and herein the RAT Type in another access network of the terminal is the HRPD. The OCS obtains that the user currently has carried out the Multiple Access, and the RAT Type is the E-UTRAN and HRPD respectively.

Step 324, the OCS makes a policy of reporting the credit control information according to the RAT Type HRPD, such as the re-authorized trigger and so on, and returns to the PCEF;

Step 325, the P-GW saves information such as the own IP address into the HSS, and registers the Multiple Access in the HSS;

Step 326, the P-GW returns the proxy binding acknowledge message to the trusted non-3GPP access gateway, wherein this proxy binding acknowledge message carries the IP address which is allocated to the UE by the P-GW;

Step 327, the trusted non-3GPP access gateway returns a response message to the UE, wherein this response message carries the IP address of the UE;

In the above flow, the OCS system knows that one IP-CAN session of the terminal is accessed through the 3GPP access network and the non-3GPP access network at the same time, and the OCS system carries out differentiated charging for the data flows passing through different access network connections of the terminal, and carries out credit control and online charging for the IP-CAN session of the terminal, and the PCRF carries out the policy charging control regarding this IP-CAN session.

Example two

The charging system for a terminal being accessed through multiple access networks comprises an IP Connectivity Access Network (IP-CAN) Type parameter reporting subsystem and a charging subsystem;

the IP-CAN Type parameter reporting subsystem is used for when the terminal establishes one IP-CAN session through at least one access network with the packet data network, reporting the IP-CAN Type parameters of each access network connection passed through by the data flows of the service accessed by said terminal to said charging subsystem;

the charging subsystem is used for charging differently for the data flows passing through different access network connections according to said IP-CAN Type parameters; and is also used for when a access network connection passed through by the data flow accessed by the terminal is changed, identifying this data flow according to the identifier of this data flow, and charging for this data flow according to the charging rules of the access network corresponding to the this IP-CAN Type parameter.

In this example, the IP-CAN Type parameter reporting subsystem comprises a Policy and Charging Enforcement Function (PCEF);

the PCEF is used for when the terminal establishes one IP-CAN session through at least one access network with the packet data network, sending the IP-CAN Type parameters of each access network connection passed through by the data flows of the services accessed by the terminal to said charging subsystem; and is also used for when the access network connection passed through by a data flow of the service accessed by the terminal is changed, sending the IP-CAN Type parameters of the new access network connection passed through by this data flow and the identifier of this data flow to said charging subsystem.

Figure 4:
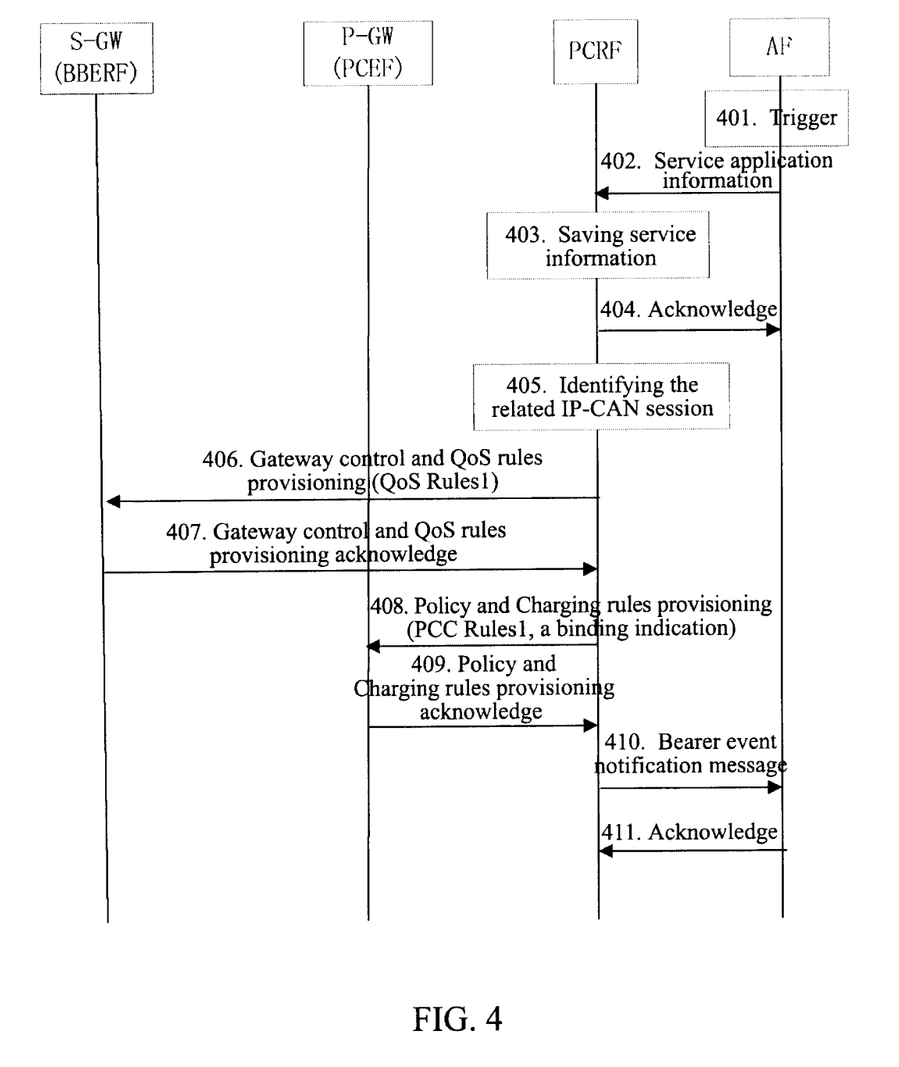
FIG. 4 is a flow chart of the PCRF notifying the Multiple Access case of terminal to the AF according to the example two.

As shown in FIG. 4, after establishing the IP Connectivity Access Network (IP-CAN) session through the 3GPP (the access network is the E-UTRAN) and the trusted non-3GPP access network (the access network is the HRPD) Multiple Access, the UE accesses a new service, and the flow chart of the PCRF notifying the Multiple Access case of terminal to the AF comprises specific steps:

Step 401, the UE makes a request message to access a new service (assuming this service is the p2p downloading service), and after receiving the message, the AF establishes a new AF session and provides service information, and the corresponding IP data flow is the SDF1.

Step 402, the AF sends a service/application message to the PCRF, and said message carries the IP address of the UE which accesses services, and furthermore, said message can also carry the identifier of UE;

Step 403, the PCRF saves the service information;

Step 404, the PCRF returns an acknowledge message to the AF, and this message carries an indication of the user Multiple Access, and two RAT Types of the current Multiple Access, namely the E-UTRAN and the HRPD;

Step 405, the PCRF identifies the IP-CAN session established in the flow of the FIG. 3 according to the IP address of the UE and the identifier of UE. At this time, the PCRF knows the UE carries out Multiple Access through the trusted non-3GPP access network and the E-UTRAN. The PCRF makes the PCC Rules 1 and QoS Rules 1 according to the service characteristics such as the user's subscription information, the network policy, the indication of the destination access network connection by which the UE determines to transmit the SDF1 and the service information and so on, and determines to transmit this service data flow through the E-UTRAN access network;

Step 406, since the PCRF determines to transmit this service through the E-UTRAN, the PCRF sends the QoS Rules 1 to the BBERF in the S-GW through the gateway control and QoS rules provisioning message;

Step 407, the BBERF installs the QoS Rules1, and the E-UTRAN enforces the corresponding policy, and the BBERF returns the acknowledge message;

Step 408, the PCRF sends the PCC Rules1 to the PCEF in the P-GW through the policy and charging rules provisioning message, and the message carries the binding indication, and this indication indicates when the PCEF detects the service data flows applying the PCC Rules1, these service data flows will be sent to the connection through the E-UTRAN access network. This binding indication identifies the PCRF determined access network connections by carrying the unique information which distinguishes each access network connection, for example, this binding indication can carry the IP-CAN Type parameter, and the IP-CAN Type parameter can be the IP-CAN Type or can further carry the Radio Access Type (RAT Type), and herein the IP-CAN Type can be the 3GPP_EPS, and the RAT Type is the E-UTRAN;

Step 409, the PCEF installs the PCC Rules 1, and according to the binding indication, binds the PCC rules and the E-UTRAN access network connection, and returns the acknowledge message;

Step 410, the PCRF sends a message to the AF, and notifies AF that this service data flow is transmitted by the E-UTRAN. The message carries the IP-CAN Type or further carries the RAT type, and the identifier of this service data flow. The IP-CAN type is the 3GPP_EPS, and the Radio Access Technology Type is the E_UTRAN. Besides, the message also can carry the Multiple Access indication and the access networks of the current Multiple Access to notify the AF that the terminal is multi-accessed currently and the access networks of the current Multiple Access respectively are the E-UTRAN and the HRPD.

Step 411, the AF saves this information, and returns the acknowledge message.

In the above method, the PCRF determines to transmit the new service of the terminal through which access network connection, and notifies the AF, and the AF sends the IP-CAN Type of the access network connection passed through by this service data flow of the terminal or the RAT Type which is further carried (the IP-CAN type is the 3GPP_EPS, and the Radio Access Technology Type is the E-UTRAN) to the OCS system, and the OCS system charges for this new service in terms of the charging standard corresponding to the E-UTRAN access network connection according to this information.

In other examples, the UE or the PCEF can also determine to transmit this service by the E-UTRAN, and notify the PCRF, and similarly, the PCRF notifies the AF that the IP data flow of this service is transmitted through the E-UTRAN access network connection, and reports the IP-CAN Type parameters (the IP-CAN type and/or the Radio Access Technology Type).

Besides the above cases, the different type data in the same service of the UE can be transmitted by different access networks. For example, if the AF initiates the video phone service, then the session information of this AF will include the audio IP data flow information and the video IP phone service, and if the UE, PCRF or the PCEF determines to transmit the audio IP data flow through the E-UTRAN and transmit the video IP data flow through the trusted non-3GPP access, the PCRF will report the IP-CAN type of the access network connection passed through by the audio IP data flow which is the 3GPP_EPS and/or the Radio Access Technology Type which is the E-UTRAN to the AF, and if the trusted non-3GPP access network is the HRPD, then the IP-CAN type of the access network connection passed through by the video IP data flow is the 3GPP2 and/or the Radio Access Technology Type is the HRPD. Thereby the AF sends the access network connections which transmits the audio IP data flow and video IP data steam of this service to related network elements (for example, the OCS/OFCS is used for carrying out differentiated charging for this IP data flow). Wherein, the audio IP data flow and the video data flow are identified by corresponding flow identifiers. The flow is similar to FIG. 4.

For the Multiple Access scenario of the UE through the 3GPP and non-3GPP access networks at the same time, the UE uses DSMIPv6 protocol when accessed through the non-3GPP access network, and the method of the PCRF notifying the AF the IP-CAN type and/or the Radio Access Technology Type of the access network connections which transmits the IP data flows of the services is similar.

Example Three

The terminal may be required to change the IP data flow transmitting path of service due to a certain reason, and when the IP data flow transmitting path is changed, it can be caused by reasons such as the UE active requesting or access network requesting, P-GW requesting, user's subscription information changed or network policy changed and so on.

Figure 5:
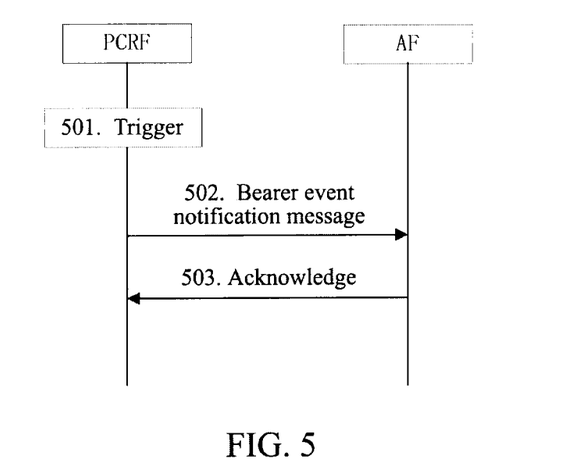
FIG. 5 is a flow chart of the PCRF notifying the IP data flow transmitting path of service to the AF when the terminal changes the IP data flow transmitting path of service according to the example three.

FIG. 5 is a flow chart described in this example that after the IP data flow transmitting path is changed, the PCRF notifies the new path (namely through which access network) of the IP data flow of terminal to the AF, which particularly comprises following steps:

Step 501, the PCRF receives the internal trigger message or external trigger message, and transfers a certain service data flow of the terminal to other access networks, for example access from the E-UTRAN is transferred to access from the trusted non-3GPP;

Step 502, the PCRF sends a bearer event notification message to the AF, and the message carries the identifier of this service data flow (used for identifying this data flow) and the IP-CAN Type parameters of the access network connection passed through by this service data flow, and if transferred to the trusted non-3GPP access network is the HRPD, then the IP-CAN type of the access network connection is the 3GPP2, and the Radio Access Technology Type is the HRPD; and at the same time, this message can also carry the indication of the IP data flow of service being transferred;

Step 503, the AF saves this information, and returns an acknowledge message.

Furthermore, the AF sends the received data flow identifier and the IP-CAN Type parameters of the passed through access network connection to the OCS system, and the OCS system identifies this service data flow according to said identifier, and charges for this IP data flow according to the charging rule of the access network corresponding to the IP-CAN Type or further carried RAT Type (namely the IP-CAN type is the 3GPP2, and the Radio Access Technology Type is the HRPD).

A specific example of this example is as follows: the terminal carrying out the video phone service, wherein the audio IP data flow passes through the E-UTRAN access network, and the video IP data flow passes through the HRPD access network, and when this audio IP data flow also requires transferring to the HRPD access network, the PCRF sends a bearer event notification message to the AF, and this message carries the identifier of the audio IP data flow and the IP-CAN Type and the RAT Type of the new access network connection (the IP-CAN type is the 3GPP2, and the Radio Access Technology Type is the HRPD), and the AF forwards the received information to the OCS system, and the OCS system identifies this audio IP data flow according to the identifier of the audio IP data flow, and charges for this service data flow according to the charging rule of this HRPD access network.

Figure 6:
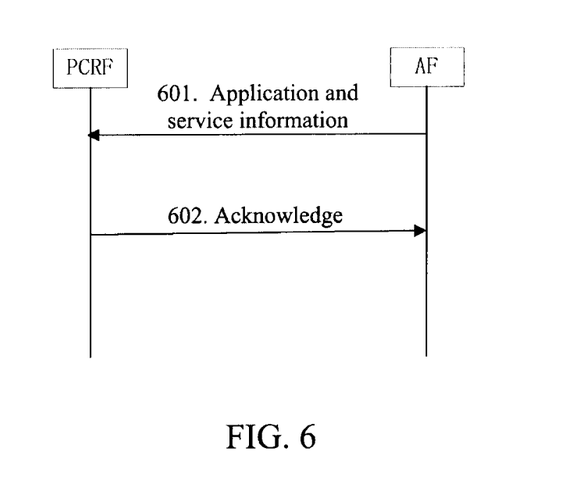
FIG. 6 is a flow chart of the PCRF reporting the UE multiple access to the AF which does not support the multiple access.

For those AFs which have not been updated to support the Multiple Access, even if the PCRF reports services or the IP data flow of the service is transmitted by which access network, the AF is also unable to carry out processing, however, the AF can customize a specific action to notify the PCRF to report, and thereby the Multiple Access case of the terminal is known. As shown in FIG. 6, the flow of the PCRF reporting the Multiple Access case of UE to the AF which does not support the Multiple Access comprises:

Step 601, the AF sends an application and service information message to the PCRF, and the message carries Specific-Action information, and notifies the PCRF that when the UE is multi-accessed, the PCRF is required to report the Multiple Access case of UE to the AF. Furthermore, the AF can also customize that the PCRF is required to report the IP-CAN Type parameters of the access network connections transmitting each IP data flow (the IP-CAN type and/or Radio Access Technology Type);

Step 602, the PCRF installs this Specific Action. Afterwards, when the UE is multi-accessed, the PCRF reports the UE Multiple Access to the AF, and further reports the IP-CAN type and/or Radio Access Technology Type of the access network connections transmitting each IP data flow. The specific operations can refer to the examples two to four.

Figure 7:
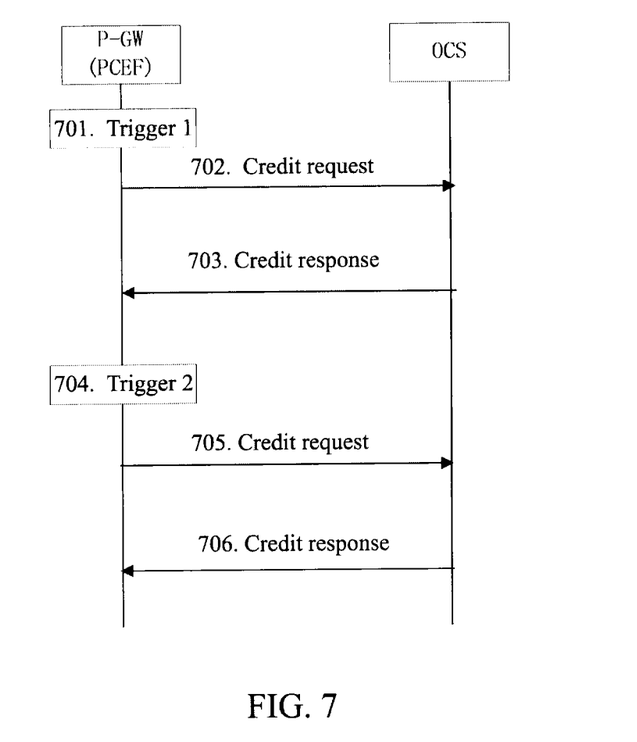
FIG. 7 is a flow chart of the PCEF reporting the UE multiple access to the OCS which does not support the multiple access.

For those OCSs which have not been updated to support the Multiple Access, even if the PCEF reports the Multiple Access case, the OCS is also unable to carry out processing. However, the OCS can customize a specific action to notify the PCEF to report, and thereby the Multiple Access case of the terminal is known. As shown in FIG. 6, the flow of the PCEF reporting the Multiple Access case of UE to the OCS which does not support the Multiple Access comprises:

Step 701, the UE powers on to initiate an attachment flow, and the P-GW accepts the UE's request, and establishes a connection to the PDN through the E-UTRAN;

Step 702, the PCEF sends a credit request message to the OCS, and the current IP-CAN type carried in the message is the 3GPP_EPS, and the Radio Access Technology Type is the E-UTRAN;

Step 703, the OCS saves the information, and according to the IP-CAN type of the access network connection 3GPP_EPS and the Radio Access Technology Type E-UTRAN, makes a credit control reporting policy, and when a credit response message is returned to the PCEF, sends down a Multiple Access reporting re-authorized trigger at the same time, and returns to the PCEF, and the PCEF carries out installation;

Step 704, the UE initiates a Multiple Access request, and the PDN is multi-accessed through the HRPD, and the P-GW receives this request;

Step 705, the PCEF sends a credit request to the OCS, reports the Multiple Access indication, and carries the RAT Type HRPD at the same time;

Step 706, the OCS returns a response message.

The above description is only the preferred example of the present invention, which is not used for limiting the present invention, and for person skilled in the art, the present invention can also have various modifications and transformations. And all the modifications, equivalent replacements and improvements without departing from the spirit or principle of the present invention, should all fall into the protection scope of the present invention.

INDUSTRIAL APPLICABILITY

In a scenario of a user equipment (UE) being accessed through multiple access networks, one IP-CAN session of the UE has at least one IP-CAN Type and/or RAT Type, and multiple services accessed by the UE are transmitted by access network connections of the different Radio Access Technology Types at the same time, and even different IP data flow of one service accessed by the UE will be transmitted by the access network connections of different Radio Access Technology Types. The method and system of the present invention are used to notify OCS/OFCS system of Multiple Access case of terminal through the application layer and the bearer layer respectively, and to implement differentiated charging, which can be used for the charging demands of different operators in the application layer and the bearer layer respectively, and makes the charging more reasonable to meet the charging demands of different content providers.

What is claimed is:

1. A charging method for a terminal being accessed through multiple access networks, and said charging method comprising:

when the terminal establishes one IP Connectivity Access Network (IP-CAN) session with a packet data network through a plurality of access networks simultaneously to transmit different data flows of one or more services, a charging subsystem knowing Multiple Access of said terminal from a Policy and Charging Rules Function (PCRF) through an Application Function (AF);

the PCRF sending an IP-CAN Type parameter of each access network connection passed through by each data flow of the service accessed by said terminal and a corresponding flow identifier to the AF, wherein each data flow is identified by the corresponding flow identifier;

said AF sending said IP-CAN Type parameter and said corresponding flow identifier to said charging subsystem, and said charging subsystem identifying the corresponding data flow according to the flow identifier, and charging differently for the data flows passing through different access network connections of said terminal according to corresponding IP-CAN Type parameters.

2. The charging method as claimed in claim 1, wherein each IP-CAN Type parameter comprises an IP Connectivity Access Network type, or comprises said IP Connectivity Access Network type and a Radio Access Technology Type.

3. The charging method as claimed in claim 2, comprising:
when the access network connection passed through by one data flow of the service accessed by said terminal is changed, said PCRF sending another IP-CAN Type parameter of a new access network connection passed through by said data flow and the flow identifier of said data flow to said charging subsystem through said AF,
said charging subsystem identifying said data flow according to said flow identifier, and charging for said data flow according to a charging rule of the access network corresponding to the IP-CAN Type parameter of said new access network connection.

4. The charging method as claimed in claim 2, comprising:
said AF notifying said PCRF that when said terminal is accessed through multiple access networks, said PCRF is required to report the IP-CAN Type parameter of each access network connection passed through by the corresponding data flow of the service accessed by said terminal to said AF; and
after receiving a notification, said PCRF reporting the IP-CAN Type parameters of the access network connections to said AF when said terminal is accessed through multiple access networks.

5. The charging method as claimed in claim 1, comprising:
when the access network connection passed through by one data flow of the service accessed by said terminal is changed, said PCRF sending another IP-CAN Type parameter of a new access network connection passed through by said data flow and the flow identifier of said data flow to said charging subsystem through said AF,
said charging subsystem identifying said data flow according to said flow identifier, and charging for said data flow according to a charging rule of the access network corresponding to the IP-CAN Type parameter of said new access network connection.

6. The charging method as claimed in claim 1, comprising:
said AF notifying said PCRF that when said terminal is accessed through multiple access networks, said PCRF is required to report the IP-CAN Type parameter of each access network connection passed through by the corresponding data flow of the service accessed by said terminal to said AF; and
after receiving a notification, said PCRF reporting the IP-CAN Type parameters of the access network connections to said AF when said terminal is accessed through multiple access networks.

7. A reporting method for a terminal being accessed through multiple access networks, and said reporting method comprising:
when the terminal establishes one IP Connectivity Access Network (IP-CAN) session with a packet data network through a plurality of access networks simultaneously to transmit different data flows of one or more services, a Policy and Charging Rules Function (PCRF) sending an IP-CAN Type parameter of each access network connection passed through by each data flow of the service accessed by said terminal and a corresponding flow identifier to an Application Function (AF), wherein each data flow is identified by the corresponding flow identifier.

8. The reporting method as claimed in claim 7, further comprising:
when the access network connection passed through by one data flow of the service accessed by said terminal is changed, said PCRF sending another IP-CAN Type parameter of a new access network connection passed through by said data flow and the flow identifier of said data flow to said AF.

9. The reporting method as claimed in claim 8, further comprising:
said AF notifying said PCRF that when said terminal is accessed through multiple access networks, said PCRF is required to report the IP-CAN Type parameter of each access network connection passed through by the corresponding data flow of the service accessed by said terminal to said AF; and
after receiving a notification, said PCRF reporting the IP-CAN Type parameters of the access network connections to said AF when said terminal is accessed through multiple access networks.

10. The reporting method as claimed in claim 7, further comprising:
said AF notifying said PCRF that when said terminal is accessed through multiple access networks, said PCRF is required to report the IP-CAN Type parameter of each access network connection passed through by the corresponding data flow of the service accessed by said terminal to said AF; and
after receiving a notification, said PCRF reporting the IP-CAN Type parameters of the access network connections to said AF when said terminal is accessed through multiple access networks.

11. A charging system for a terminal being accessed through multiple access networks, and said charging system comprising a Policy and Charging Rules Function (PCRF), an Application Function (AF) and a charging subsystem; wherein,
said PCRF is configured to, when the terminal establishes one IP-CAN session with a packet data network through a plurality of access networks simultaneously to transmit different data flows of one or more services, report an IP-CAN Type parameter of each access network connection passed through by each data flow of the service accessed by said terminal and a corresponding flow identifier to said AF, wherein each data flow is identified by the corresponding flow identifier;
said AF is configured to send said IP-CAN Type parameter and said corresponding flow identifier to said charging subsystem; and
said charging subsystem is configured to identify the corresponding data flow according to the flow identifier, and charge differently for the data flows passing through different access network connections of said terminal according to corresponding IP-CAN Type parameters.

12. The charging system as claimed in claim 11, wherein each IP-CAN Type parameter comprises an IP Connectivity Access Network type, or comprises said IP Connectivity Access Network type and a Radio Access Technology Type.

13. The charging system as claimed in claim 11, wherein,
said PCRF is further configured to, when the access network connection passed through by one data flow of the service accessed by said terminal is changed, send another IP-CAN Type parameter of a new access network connection passed through by said data flow and the flow identifier of said data flow to said AF;

said AF is further configured to send the received IP-CAN Type parameter of the new access network connection and the received flow identifier of said data flow to said charging subsystem; and said charging subsystem is further configured to identify said data flow according to said flow identifier, and charge for said data flow according to a charging rule of the access network corresponding to the IP-CAN Type parameter of said new access network connection.

* * * * *